(12) United States Patent
Wright et al.

(10) Patent No.: US 8,438,296 B2
(45) Date of Patent: May 7, 2013

(54) PLAYBACK COMMUNICATIONS USING A UNIFIED COMMUNICATIONS PROTOCOL

(75) Inventors: Kenneth W. Wright, Warrenton, VA (US); John S. Lear, Purcellville, VA (US); John E. Stem, Berryville, VA (US); Robert Harrover, Manassas, VA (US); Julian Zottl, Springfield, VA (US)

(73) Assignee: Raytheon Company, Waltham, MA (US)

( * ) Notice: Subject to any disclaimer, the term of this patent is extended or adjusted under 35 U.S.C. 154(b) by 456 days.

(21) Appl. No.: 12/463,127

(22) Filed: May 8, 2009

(65) Prior Publication Data

US 2010/0287293 A1      Nov. 11, 2010

(51) Int. Cl.
*G06F 15/16*      (2006.01)
(52) U.S. Cl.
USPC ........... 709/230; 709/201; 709/202; 709/206; 709/207; 709/223; 707/769; 345/753
(58) Field of Classification Search ................... 709/201, 709/202, 203, 206, 207, 223, 230; 707/769; 345/753
See application file for complete search history.

(56) References Cited

U.S. PATENT DOCUMENTS

| | | | |
|---|---|---|---|
| 6,549,937 B1 * | 4/2003 | Auerbach et al. | 709/206 |
| 6,859,609 B1 * | 2/2005 | Watkins | 386/242 |
| 7,814,518 B2 * | 10/2010 | Ducheneaut et al. | 725/80 |
| 2002/0161578 A1 * | 10/2002 | Saindon et al. | 704/235 |
| 2003/0227479 A1 * | 12/2003 | Mizrahi et al. | 345/753 |
| 2007/0100952 A1 * | 5/2007 | Chen et al. | 709/207 |
| 2009/0119734 A1 * | 5/2009 | Deshpande et al. | 725/118 |
| 2010/0195623 A1 * | 8/2010 | Narasimhan et al. | 370/332 |
| 2010/0274796 A1 * | 10/2010 | Beauregard et al. | 707/769 |

* cited by examiner

*Primary Examiner* — Thuong Nguyen
(74) *Attorney, Agent, or Firm* — Cantor Colburn LLP (57) ABSTRACT

According to particular embodiments, a system for outputting prerecorded communications includes a central server that receives playback instructions, retrieves event data from a database according to the playback instructions, and outputs events from the event data to an agent server according to the timing characteristics associated with the events, and the agent server that deploys playback agents into the target group communication service to submit events to the target group communication service.

20 Claims, 4 Drawing Sheets

PLAYBACK COMMUNICATIONS USING A UNIFIED COMMUNICATIONS PROTOCOL

TECHNICAL FIELD

This disclosure relates generally to communication systems and, more particularly, to communication systems and methods for outputting prerecorded communications.

BACKGROUND

People often use the Internet as a means for social interaction (through email, instant messaging, chat rooms, electronic message boards, etc.). They may subscribe to chat services that are provided by chat service providers. In addition, services such as match.com, trading marketplaces such as eBay, and online recruiting sites such as monster.com may incorporate chat services into their business models. As people increasingly exchange communications over the Internet, they expose a wealth of information about themselves.

SUMMARY

According to particular embodiments, a system for outputting prerecorded communications includes an agent server and a central server. The central server includes a playback module and a database, which maintains user profiles and event data prerecorded from real-time, text-based group communication services. The event data includes events and, associated with each event, timing characteristics. The playback module receives playback instructions, retrieves portions of the event data from the database, outputs the events from the retrieved portions of the event data according to the timing characteristics associated with the events, and outputs the events according to a first communication protocol. The agent server deploys a playback agent that receives one of the user profiles and an identification of a target group communication service. The agent server also registers with the target group communication service using the received user profile, receives at least a portion of the outputted events from the playback module, translates the received events into a native communication protocol of the target group communication service, and submits the translated events to the target group communication service.

Certain embodiments may provide one or more technical advantages. A technical advantage of one embodiment may be the ability to provide prerecorded data from a text-based group communication service (such as a Yahoo! chatroom and an AOL chatroom) in real-time to a target group communication service, even for group communication services operating in different protocols. Due to the unified interface, the system is protocol independent and expandable to include any communication protocol. Many organizations use chatrooms as a collaboration tool for military training, system demonstrations, other types of demonstrations and/or interactive training purposes. Certain embodiments of the present disclosure enable such organizations to leverage real, collected data in demonstrations, simulations and training situations using a communication protocol of their choice. Other applications such as chat system load testing are also possible.

Another advantage of one embodiment may be that users may join a target group communication service by merely registering as a user of the target group communication service and joining the target group communication service as an active participant.

Other technical advantages of the present disclosure may be readily apparent to one skilled in the art from the following figures, descriptions, and claims. While specific advantages have been enumerated above, various embodiments may include all, some, or none of the enumerated advantages.

BRIEF DESCRIPTION OF THE DRAWINGS

For a more complete understanding of embodiments of the present disclosure and its advantages, reference is made to the following description, taken in conjunction with the accompanying drawings, in which.

DETAILED DESCRIPTION OF EXAMPLE EMBODIMENTS

In accordance with the teachings of the present disclosure, a method and system are provided that support outputting prerecorded communications. In general, the method and system for outputting prerecorded communications deploys a playback agent into a target group communication service to playback prerecorded communications.

Figure 1:
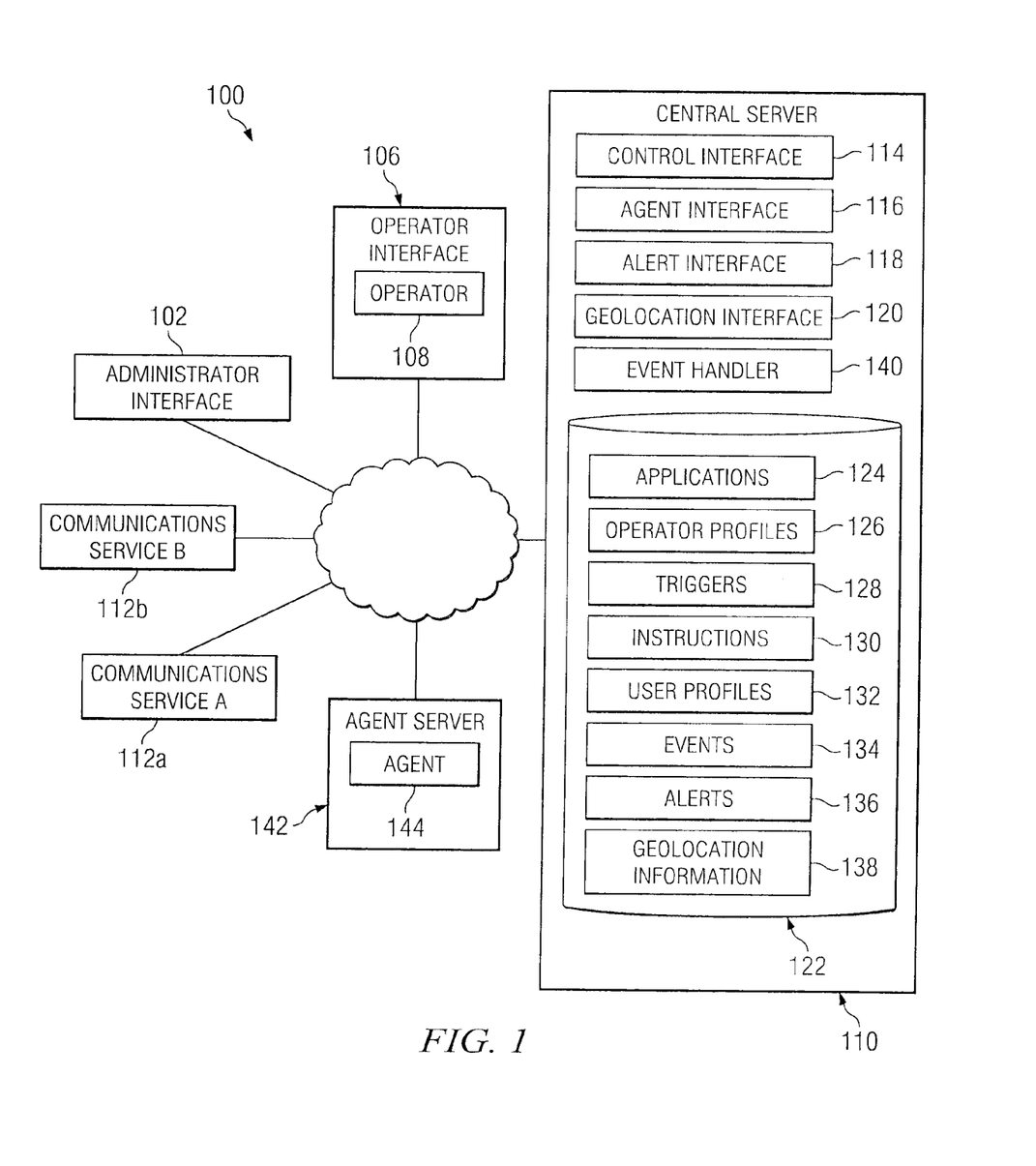
FIG. 1 illustrates example portions of a system for outputting prerecorded communications in accordance with various embodiments of the present disclosure.

FIG. 1 illustrates a portion of a system 100 for outputting prerecorded communications. As illustrated, system 100 includes group communication services 112, operator interface 106, operator 108, administrator interface 102, central server 110, agent server 142, and agent 144. In operation, system 100 supports playback of prerecorded communications by providing a playback module 150 within central server 110 that retrieves a portion of events 134 from the database 122 and outputs the events 134 according to the timing characteristics associated with the events 134 to an agent server 142, which deploys playback agents 144 that translate the events 134 into a native communication protocol of the target group communication service 112b and submit the translated events 134 to the target group communication service 112b.

Group communication services 112 include chat rooms, online messaging services, and any other service for communication between users registered to communicate with other users through that service using a particular communication protocol. The present disclosure is not limited to particular group communication services such as chat room services or instant messaging services. A user represents a person whose communications using a group communication service 112 are subject to being monitored and/or recorded. A user may be considered active if the user is transmitting and/or receiving communications within a communication service 112. A user that is logged into a communication service 112 but idle may or may not be considered an active user. Exemplary communication protocols for group communication services 112 include Internet Relay Chat ("IRC"), OSCAR protocol, Microsoft Notification Protocol (MSNP), Internet Relay Chat (IRC), rendezvous protocol, Yahoo! Messenger Protocol, and Extensible Messaging and Presence Protocol ("XMPP"). When a user registers to communicate with other users through a particular group communication service 112, users acquire a user name and/or other identification information that may be used to identify the user with the communication that it inputs into the group communication service 112. A user profile 132 contains some or all identification information associated with a particular user. For example, user profile 132 may include a user name and password for a particular communication service 112.

Administrator interface 102 represents hardware and/or appropriate controlling software for setting up operator interfaces 106 to monitor one or more group communication services 112 within system 100. Administrator interface 102 receives instructions 130 regarding particular group communication services 112 to be monitored and particular target group communication services 112b for playing back prerecorded events 134 and transmits those instructions 130 to central server 110. In operation, administrator interface 102 assigns one or more group communication services 112 to each one of multiple operator interfaces 106 and sets up the operator interfaces 106 for operators 108 to monitor one or more group communication services 112 within system 100. Administrator interface 102 provides a separate window, tab or other graphical container for each group communication service 112 that is assigned to a particular operator interface 106.

In some embodiments, operators 108 represent hardware and/or appropriate controlling software. In other embodiments, operators 108 refer to the person or persons attempting to monitor and/or transmit communication using operator interfaces 106 by any method or means. Operators 108 monitor, submit and receive communication within group communication services 112 through operator interfaces 106. Operators 108 also enter triggers 128, such as an alert trigger 128, a data request trigger 128, a user visibility trigger 128, a playback command trigger 128, and/or any other type of trigger 128 into operator interfaces 106 to be sent to central server 110. For example, operator 108 may request to be alerted if any user's communication in group communication service 112a mentions "Iraq" or request to automatically respond "hello" when a user enters group communication service 112b or respond "I am not interested in meeting in person" when a user asks to "meet in person." In addition, operators 108 may input requests into operator interfaces 106 to be sent to central server 110. For example, operator 108 may request the last ten seconds of data from group communication service 112a, the latest alerts 136 from group communication service 112a, and/or a list of users currently active within group communication service 112a. As another example, operators 108 may request to be hidden from one, some, or all users when monitoring a particular group communication service, such as group communication service 112a.

As a further example, an operator 108 may enter a playback command trigger 128 into an operator interface 106 to be sent to central server 110. To enter a playback command trigger 128, operator 108 identifies a particular communication service 112 as a target group communication service 112b and selects prerecorded events 134 from a source communication service 112a for playback into the target group communication service 112b. The source and/or target group communication services 112a and 112b may or may not be one of the communication services 112 that the operator 108 entering the playback command trigger 128 is set up to monitor using operator interface 106. To select events 134 from a source communication service 112a that are stored in database 122, operator 108 may enter the name or other identifier of the source communication service 112a and a range of dates and/or times. Although operator 108 is shown as part of operator interface 106, operator 108 may be logically or physically separated from operator interface 106.

Operator interfaces 106 represent hardware and/or appropriate controlling software for displaying data collected from one or more of the group communication services 112 within system 100. Operator interfaces 106 are situated to receive from central server 110 and display to operators 108 the data collected and events 134, alerts 136, and geolocation information 138 associated with the data collected. Operator interfaces 106 may display data within any number, type, and/or arrangement of tabs, windows, and other display components using any graphics, display templates, and/or other suitable display software that may be used with a web browser. For example, operator interfaces 106 may run software for mapping geolocation information 138 onto a map for display to operators 108. According to particular embodiments, operator interfaces 106 interact with central server 110 using web-based protocols, such as hypertext transfer protocol (HTTP) or secure HTTP (HTTPS). Operator interfaces 106 are described in more detail below with regard to FIG. 2.

Central server 110 may be any one of a variety of hardware and software components that function to centrally store and process data collected from one or more group communication services 112 and to transmit selected stored and processed data to operator interfaces 106 and/or agent servers 142. Central server 110 is situated to receive instructions 130 regarding particular group communication services 112 to be monitored from administrator interface 102 and to couple agent servers 142 to operator interfaces 106 to populate the operator interfaces 106 with data from one or more of the group communication services 112 for operators 108 to monitor. As illustrated, central server 110 includes a control interface 114, an agent interface 116, an alert interface 118, a geolocation information interface 120, a database 122, and an event handler 140. While a particular embodiment is illustrated, however, central server 110 may comprise any number and/or type of interface components. For example, central server 110 may include only a single control interface rather than multiple control interfaces. Although only central server 110 and agent servers 142 are illustrated, any number and/or type of servers may be coupled to system 100.

Database 122 may include any number of computer hardware elements or software elements to function as a memory for system 100. Database 122 includes applications 124, operator profiles 126, triggers 128, instructions 130, user profiles 132, events 134, alerts 136, geolocation information 138, and other information as may be necessary according to various implementations of the present example. As illustrated, database 122 may be compartmentalized into different holding places according to particular categories. However, information may be stored in database 122 without regard to categorical distinctions. In particular embodiments, agent server 142 stores instructions 130 in database 122.

Applications 124 are logic encoded in media, such as software and/or programmed logic devices capable of execution when loaded into processing devices, to support monitoring of multiple group communication services using multiple protocols. Central server 110 uses applications 124 to monitor multiple group communication services using multiple protocols. For example, an application 124 may be an algorithm to search events 124 for keyword triggers 128. Another exemplary application 124 may be an algorithm for mapping event queues and alert queues to the appropriate operator interfaces 106.

An operator profile 126 for a particular operator interface 106 includes the one or more group communication services 112 assigned to that operator interface 106. Administrator interface 102 creates an operator profile 126 for a particular operator interface 106 by assigning one or more group communication services 112 to that operator interface 106. Operator profiles 126 are used by central server 110 to transmit to operator interfaces 106 only those event queues and alert queues that are associated with the group communication services 112 assigned to the operator interfaces 106.

Instructions 130 identify the particular group communication services 112 for system 100 to monitor. In particular embodiments, instructions 130 identify particular group communication services 112 to be monitored and/or particular target group communication services 112b for playing back prerecorded events 134. Administrator interface 102 receives instructions 130 from a human administrator and/or other entity capable of entering or otherwise communicating instructions 130 to administrator interface, such as, for example, software and/or hardware such as networking equipment and/or servers. Administrator interface 102 transmits instructions 130 to central server 110. Central server 110 receives instructions 130 from administrator interface 102 and transmits instructions 130 to agent server 142, which forwards and may or may not modify and/or reformat all or a portion of instructions 130 to agents 144. Agent server 142 may divide instructions 130 into sets of instructions 130 and send a selected set of instructions 130 to each of multiple agents 144, as each agent 144 may monitor only one group communication service 112 at a time. In particular embodiments, central server 110 stores instructions 130 in database 122.

A user profile 132 identifies a user with a group communication service 112 and may include a user's user name and password for a particular service. When a user registers to communicate with other users through a particular group communication service 112, users acquire a user name, password, and/or other identification information that may be used to identify the user with the communication that the user inputs into the group communication service 112.

Triggers 128 are instructions to generate alerts 136, instructions to automatically respond to particular communications of one or more users, or any other instructions from operator 108 or administrator interface 102 with regard to monitoring, responding to, processing, and/or generating particular occurrences within group communication services 112 such as keywords exchanged, communication behaviors of users, geolocation information, or playback of prerecorded events 134. For example, a keyword alert trigger 128 may specify any text mentioning "Iraq." As another example, an automated response trigger 128 may specify an automated response to particular text and/or geolocation information. For example, if one or more users of a communication service 112 becomes suspicious that another user of the communication service 112 is an automated agent, they may ask the suspected user a question. In response, if the suspected user is an automated agent, the central server may instruct the automated agent to automatically respond to the question by playing back archived communications. As an additional example, a geolocation information trigger 128 may specify a test or series of tests for one or more users' locations or for whether any users of one or more group communication services 112 match a particular location. As a further example, a manual response trigger is a message that an operator 108 enters into operator interface 106 with respect to a particular communication service 112 for an agent 144 to input into the particular communication service 112 in real-time, near real-time, or at a particular time. Operators 108 input triggers 128 into operator interfaces 106 for one or more group communication services 112, central server 110 receives triggers 128 from operator interfaces 106 and transmits triggers 128 to agent server 142, and agent server 142 applies triggers 128. According to particular embodiments, central server 110 may apply certain types of triggers 128 instead of or in addition to agent server 142.

Other exemplary triggers 128 are playback command triggers 128. A playback command trigger 128 is a command that operator 108 enters into operator interface 106 or that administrator interface 102 receives (from a human administrator and/or other entity capable of entering or otherwise communicating playback command triggers 128 to administrator interface 102, such as, for example, software and/or hardware such as networking equipment and/or servers). The information comprised in a playback command trigger 128 defines one or more playback instructions. Operator interface 106 or administrator interface 102 may generate a computer-executable script from a playback command trigger 128 for carrying out the playback instructions and transmit the script to central server 110. A playback command trigger 128 specifies a portion of prerecorded events 134 from a source communication service 112a for playback into the target group communication service 112b. A playback command trigger 128 also specifies a target group communication service 112b into which one or more agents 144 playback the portion of prerecorded events 134. The portion of prerecorded events 134 for playback may be an event queue, an alert queue, a geolocation information queue, and/or any combination of one or more queues from database 122. Operators 108 may input playback command triggers 128 into operator interfaces 106 with respect to a particular group communication service 112 that they are monitoring: operators 108 may input playback command triggers 128 into operator interfaces 106 with respect to a particular group communication service 112 that they are not monitoring; or administrator interfaces 102 may receive playback command triggers 128 with respect to a particular group communication service 112. Playback module 150 of central server 110 receives the playback command triggers 128 from operator interfaces 106 and/or administrator interfaces 102 and may apply the playback command triggers 128 or transmit the playback command triggers 128 to agent server 142.

An alert 136 is an indication that a trigger 128 has been satisfied. For example, if a trigger 128 specifies any text mentioning "Iraq," an alert 136 associated with that trigger 128 would indicate that a user communicated the text "Iraq" in a group communication service 112. Agent server 142 generates alerts 136 by applying triggers 128 to data collected from one or more group communication services 112 and transmits alerts 136 to event handler 140 of central server 110. Event handler 140 stores alerts 136 in database 122. Alert interface 118 monitors database 122 for alerts 136, queues alerts 136 for particular group communication services 112, and transmits the alert queue for each group communication service 112 to the one or more operator interfaces 106 to which the associated group communication services 112 were assigned and into which the associated trigger 128 was input. Operator interlaces 106 display alerts 136 to operators 108 using any one or more display methods such as, for example, displaying a pop-up window or tab, flashing a window or tab in which all events 134, including alerts 136, are displayed, and generating an alert sound.

Events 134 represent data collected from group communication services 112, such as text messages communicated by users and any other user inputs collected by agents 144 from group communication services 112, including automated responses and any other inputs from agents 144. Events 134 include the name of the user responsible for the event 134 and timing information associated with user inputs, such as, for example, the calendar date and time, the total typing time, any information regarding the amount of time it took the user to input all or one or more parts of the input, and/or any information regarding the user's computer activity. Events 134 further include acknowledgements of users entering and exiting group communication services 112, user names of users that are active and/or registered with group communication services 112, and user entrances into and exits out of group communication services 112. Agent server 142 collects events 134 from agents 144, applies triggers 128 to events 134, and transmits events 134 to event handler 140 of central server 110 for further processing. Event handler 140 associates events 134 received from agent servers 142 with particular agents 144 that collected the events 134 and thus with particular group communication services 112 from which events 134 were collected. Event handler 140 of central server 110 stores events 134 in database 122, queues events 134 for particular group communication services 112, and transmits the event queue for each group communication service 112 to the one or more operator interfaces 106 to which the associated group communication services 112 were assigned.

Geolocation information 138 is an identification of a geographic location or other location information of a user of a group communication service 112. Agents 144 collect this information about active users of group communication services 112, whether the users are connected to the group communication service 112 via an Internet-connected computer, a mobile device, a website or any other connection. Agent server 142 collects geolocation information 138 from agents 144 and transmits geolocation information 138 to geolocation information interface 120 of central server 110 for further processing and delivery to operator interfaces 106. Event handler 140 stores geolocation information 138 in database 122. Geolocation information interface 120 monitors database 122 for geolocation information 138, queues geolocation information 138 for particular group communication services 112, and transmits the geolocation information queues for each group communication service 112 to the one or more operator interfaces 106 to which the associated group communication services 112 were assigned.

In operation, central server 110 receives instructions 130 regarding group communication services 112 to be monitored from administrator interlace 102 and routes the received instructions 130 to agent server 142 using a web protocol, such as an HTTP protocol. Central server 110 receives triggers 128 and user profiles 132 from operator interface 106 and routes them to agent server 142 using a web protocol, such as an HTTP protocol. Central server 110 receives events 134 from agent servers 142 and generates event queues, alert queues, and geolocation information queues for each one of multiple group communication services 112. In particular embodiments, event handler 140 of central server 110 may apply triggers 128 to events 134 and generate corresponding alerts 136. In particular embodiments, central server 110 receives events 134 from agent servers 142 in Extensible Markup Language (XML). In other embodiments, central server 110 receives events 134 from agent servers 142 in HTTP format. Central server 110 determines the one or more group communication services 112 assigned to each of multiple operator interfaces 106 according to operator profiles 126 and transmits the event queues, alert queues, and geolocation information queues to the appropriate operator interface 106.

Central server 110 also receives triggers 128 and handles requests from operator interface 106 regarding retrieval and/or playback of particular portions of events 134, alerts 136, and/or geolocation information 138. Central server 110 may apply triggers 128 to events that it receives from agent server 142 or transmit triggers 128 to agent server 142. In particular embodiments, operator 108 may wish to conceal the fact that an automated agent 144 is monitoring a particular communication service 112 from one, some, or all users within the communication service 112. For example, if one or more users of a communication service 112 becomes suspicious that another user of the communication service 112 is an automated agent, they may ask the suspected user a question. In response, if the suspected user is an automated agent, the automated agent may automatically respond to the question according to an automated response trigger 128 set by operator 108. In some embodiments, the automated response may comprise playing back prerecorded events 134.

Control interface 114 receives operator profiles 126 from administrator interfaces 102, requests from operator interfaces 106 regarding retrieval of particular subsets of events 134, alerts 136, and geolocation information 138, and triggers 128 from operators 108. Control interface 114 maps responses to requests from operator interfaces 106 to the appropriate operator interfaces 106 based on the requests from operator interface 106. Control interface 114 maps responsive event queues, responsive alert queues, and responsive geolocation information queues to the appropriate operator interfaces 106 based on operator profiles 126.

Agent interface 116 receives group communication services 112 to be monitored and user profiles 132 and dispatches those group communication services 112 and user profiles 132 to agents 144 through agent servers 142. Agent interface 116 is operable to load balance multiple agent servers 142 by dispatching those group communication services 112 and user profiles 132 to one or more agent servers 142.

Playback module 150 of central server 110 receives playback command triggers 128 from operator interfaces 106 and/or administrator interfaces 102 and applies the playback command triggers 128 to coordinate playback of portions of prerecorded events 134 from the database 122 by one or more playback agents 144 into a target group communication service 112*b*. To apply the playback command triggers 128, playback module 150 retrieves portions of the events 134 from the database and outputs the retrieved events 134 according to the timing information associated with the retrieved events 134. In particular embodiments, the playback module outputs the events according to a unified communication protocol.

Alert interface 118 monitors database 122 for alerts 136. Optionally, alert interface 118 may also generate alerts 136 by monitoring, database 122 for triggers 128 and events 134 and applying triggers 128 to events 134. In particular embodiments, alert interface 118 queues alerts 136 in the order in which the events 134 satisfying the triggers 128 occurred or in any other logical arrangement. Alert interface 118 may also queue alerts 136 in a separate queue for each trigger 128. According to particular embodiments, based on the control interface 114, alert interface 118 sends alerts 136 to the appropriate window within operator interface 106 for each operator 108. For example, if an operator 108 requests the last ten seconds of alerts 136 from group communication service 112*a*, alert interface 118 will respond to the request by transmitting that portion of its alert queue to operator interlace 106.

Geolocation information interface 120 monitors database 122 for geolocation information 138. Geolocation event interface 120 may queue geolocation information 138 in the order in which the associated events occurred or in any other logical arrangement. According to particular embodiments, based on the control interface 114, geolocation information interface 120 sends events to the appropriate window or location within operator interface 106 for each operator 108. For example, if an operator 108 requests the last ten seconds of geolocation information 138 from group communication service 112a, geolocation information interface 120 will respond to the request by transmitting that portion of its geolocation information queue to operator interface 106.

Event handler 140 receives events 134 from agent server 142, stores events 134 received into database 122, and communicates events 134 to operator interface 106 for each operator 108. In some embodiments, event handler 140 may parse events into categories such as alert events 136 and geolocation information 138 according to the type of information depicted by a particular event 134. In other embodiments, event handler 140 may store events 134 in database 122 without first separating events 134 into alert events 136 and geolocation information 138. In particular embodiments, event handler 140 receives events 134 through an HTTP connection. In particular embodiments, event handler 140 may apply one or more triggers 128 to events 134. For example, event handler 140 may search received events 134 for text that matches a keyword-type trigger 128 and generate a corresponding alert 136, and store the alert 136 in database 122. It may be advantageous for both agent server 142 and event handler 140 to be operable to apply the same or different triggers 128 to events 134. For example, agent server 142 may apply one or more triggers 128 as events 134 are received and event handler 140 may apply one or more triggers 128 after events 134 have been received and stored in database 122, perhaps in response to requests from operators 108 to search prerecorded events 134.

Agent server 142 provides each of multiple agents 144 with the user profile 132 necessary to register the agent 144 with a group communication service 112, dispatches one or more agents 144 into one or more group communication services 112, and receives events 134 from each of its dispatched agents 144 in the communication protocol in which the events 134 were collected. In particular embodiments, agent server 142 transmits those events 134 to event handler 140 of central server 110. In particular embodiments, agent server 142 associates events 134 received with the agent 144 that collected the events 134, queues events 134 for each agent, and transmits the event queues to event handler 140. In particular embodiments, agent server 142 associates events 134 with the user that created the events 134. In particular embodiments, agent server 142 may send events 134 to event handler 140 in the format in which the events 134 were received, that is, in the format of the group communication service 112. Alternatively, agent server 142 translates events 134 into a unified communication protocol used by central server 110. As an example, agent servers 142 may translate received events 134 into an XML-based unified communication protocol for transmission to central server 110. This enables central server 110 to monitor any number and type of group communication services 112, with agent servers 142 providing monitoring and translating. Central server 110 may employ any number of agent servers 142 to deploy the needed number of agents 144. For example, if one agent server 142 can deploy a maximum of one hundred agents 144 and central server 110 receives requests for monitoring two hundred group communication services 112, then central server 110 may employ at least two agent servers 142 to accommodate the request.

Agents 144 are assigned by agent servers 142 to monitor, collect, generate and/or relay events 134 within a particular group communication service 112. Each of the automated agents 144 receives a user profile 132 from agent server 142, registers with a group communication service 112 using the user profile 132, monitors the group communication service 112 for events 134, and/or relays events 134 in a native communication protocol of the group communication service 112. In particular embodiments, agents 144 may apply triggers 128 to events 134 to generate alerts 136 and geolocation information 138. In particular embodiments, agents 144 may playback prerecorded events 134 in the order in which they were stored in database 122 and according to the same timing information. To playback prerecorded events 134, a playback agent 144 receives a selected one of the user profiles 132 and an identification of a target group communication service 112b, registers with the target group communication service 112b using the received user profile 132, receives at least a portion of the outputted events 134 from the playback module 150, translates the received events 134 into a native communication protocol of the target group communication service 112b, and submits the translated events to the target group communication service 112b.

In particular embodiments, agent servers 142 may receive automated response triggers 128 from central server 110 that include playback instructions for generating an automated response. Agent servers 142 and/or playback agents 144 may apply automated response triggers 128 to events 134 being monitored in real-time in the target communication service 112b. To apply the automated response triggers 128, a playback agent 144 monitors events 134, including communications exchanged by users and/or other user behaviors with respect to communications exchanged by users, in a target group communication service 112b, and recognizes whether and/or when a trigger 128 is satisfied. In response to the satisfaction of an automated response trigger 128, playback agents 144 retrieve portions of prerecorded events 134 from database 122 and submit portions of retrieved events 134 into a target group communication service 112b.

In addition, in particular embodiments, the playback of prerecorded events 134 is visible by all active users of the target group communication service 112b. In alternative embodiments, the playback agent 144 receives one or more visibility triggers restricting the visibility of the playback agent 144 to one or more active users of the target communications service 112b, and the playback agent 144 applies the visibility rule such that the playback of prerecorded events 134 is not visible by all active users of the target group communication service 112b. The playback may be presented by one or more playback agents 144. For example, one playback agent 144 may playback all prerecorded events 134. As another example, one or more playback agents 144 may playback the prerecorded events 134, each of the playback agents playing back the prerecorded events 134 of a particular user from the source communication service 112a.

By playing back prerecorded events 134 into a target communications service 112b using the native communications protocol of the target communications service 112b, users of the target communications service 112b may join (i.e. become an active user in) the target communications service 112b using standard software for the target communications service 112b to execute login with their login information, and, once active, users may view the prerecorded communications that the playback agents 144 are submitting into the target communications service 112b using their existing interface of choice. For example, if events 134 from a group communications service 112a using an IRC communication protocol have previously been recorded to a database 122 using a unified communications protocol, a playback agent 144 may playback a portion of the events 134 into an IRC target group communication service 112b, and users of the target group communications service 112b may view the events 134 using standard IRC client software. Alternatively, a playback agent 144 may playback a portion of the events 134 into a Microsoft Notification Protocol (MSNP) target group communication service 112b, and users of the target group communications service 112b may view the events 134 using standard MSNP client software.

A component described in FIG. 1 may include an interface, logic, memory, and/or other suitable element.

An interface represents hardware and/or appropriate controlling software. An interface receives input, sends output, processes the input and/or output, and/or performs other suitable operations.

Logic represents software and/or programmed logic devices capable of execution when loaded onto processing devices. Processing devices include one or more computers, one or more microprocessors, one or more applications, and/or other logic. When executed, logic performs the operations of a component or manages the operations of a component, such as, for example, generating output from input. A computer-readable medium encoding logic performs and/or manages operations when loaded onto processing devices and executed.

A memory stores information. A memory may comprise one or more tangible, computer-readable, and/or computer-executable storage media. Examples of a memory include computer memory (for example, Random Access Memory (RAM) or Read Only Memory (ROM)), mass storage media (for example, a hard disk), removable storage media (for example, a Compact Disk (CD) or a Digital Video Disk (DVD)), network storage (for example, a server), and/or other computer-readable medium.

The above description provides an example of a system for outputting prerecorded communications. The example explains particular embodiments and is not all-inclusive. Although system 10 depicts a particular logical configuration of components, system 10 may include any appropriate logical and physical combination, separation, or distribution of the components and their functionality. In addition, the operations of the embodiments may be performed by one or more computer readable media encoded with a computer program, software, computer executable instructions, and/or instructions capable Of being executed by a computer. In particular embodiments, the operations of the embodiments may be performed by one or more computer readable media storing, embodied with, and/or encoded with a computer program and/or having a stored and/or an encoded computer program. As used in this document, "each" refers to every individual member of a set or every individual member of a subset of a set.

Figure 2A:
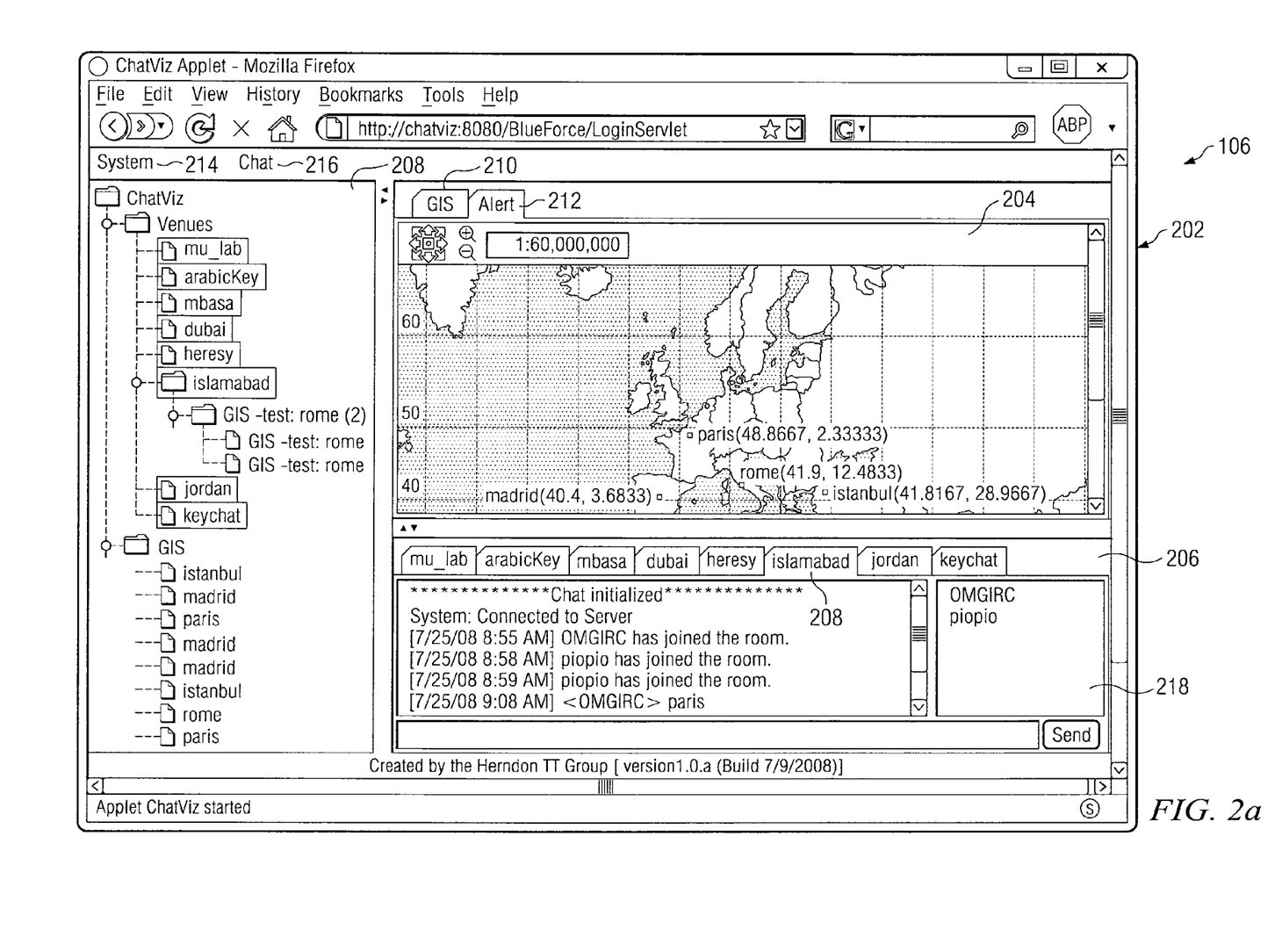
FIGS. 2A and 2B illustrate an example operator interface presenting information collected by the example system of FIG. 1.
Figure 2B:
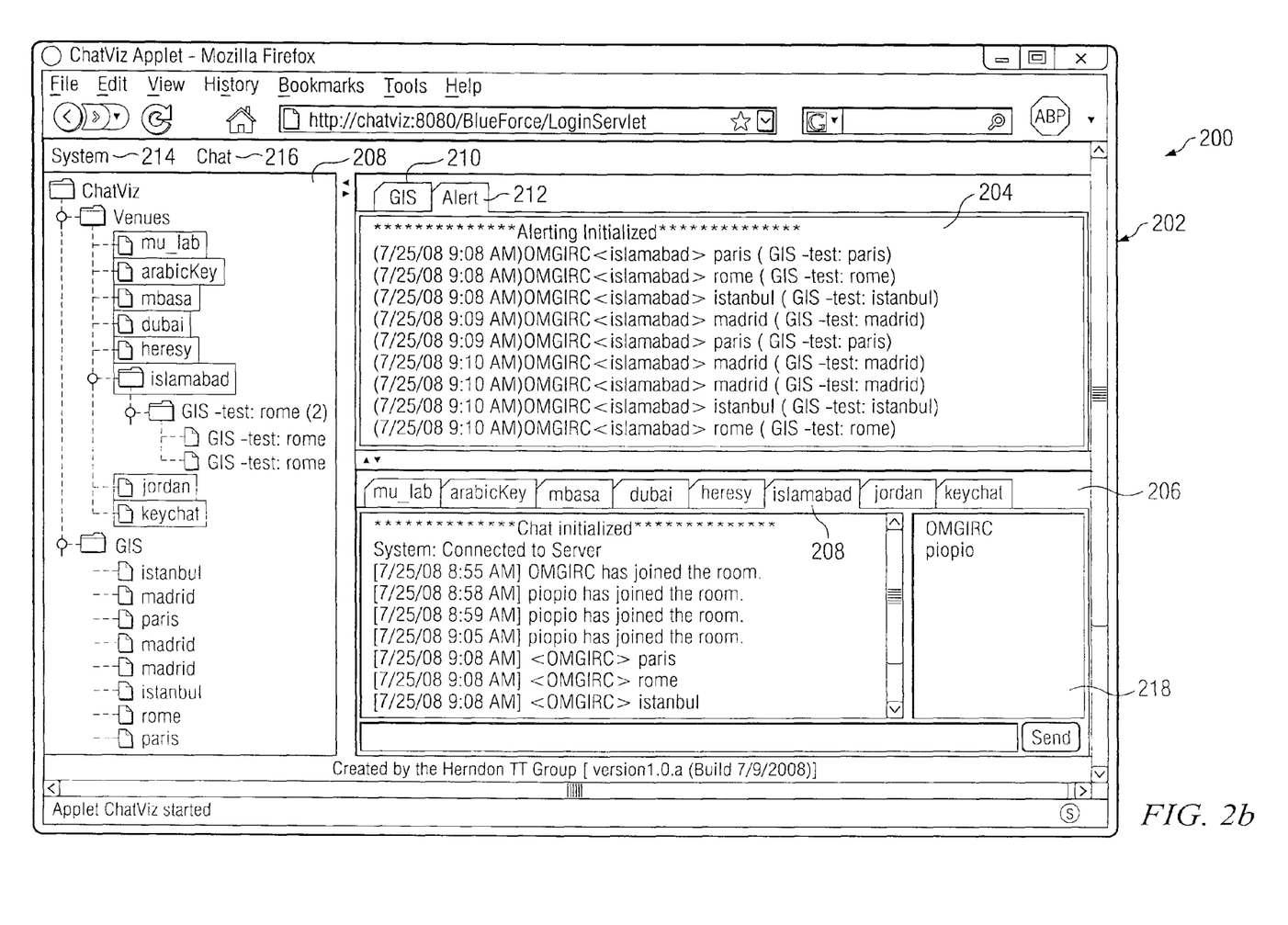
Figure 3:
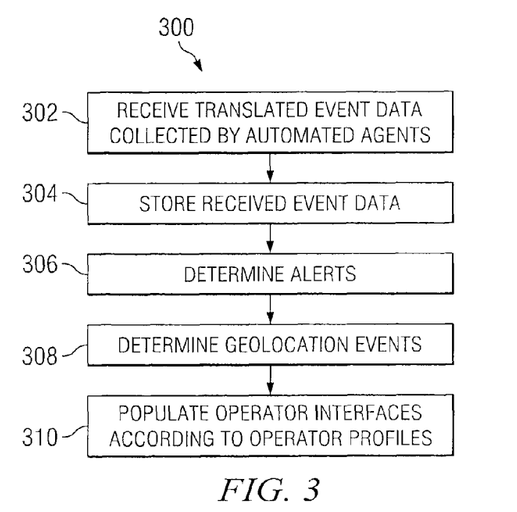
FIG. 3 is a flowchart that illustrates a method for monitoring communications using the example system of FIG. 1.
Figure 4:
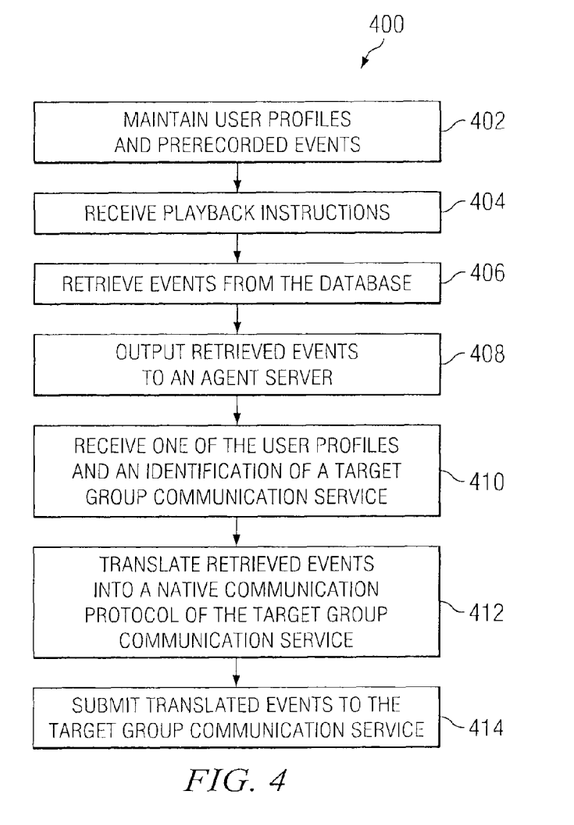
FIG. 4 is a flowchart that illustrates a method for outputting prerecorded communications using the example system of FIG. 1.

FIGS. 2, 3 and 4 illustrate additional details of example embodiments shown in FIG. 1. The description below referring to FIG. 2 describes an example operator interface presenting selected information from the example system 100 of FIG. 1. The description below referring to FIG. 3 describes an example method for monitoring multiple group communication services 112 using multiple protocols.

FIGS. 2A and 2B illustrate an example operator interface, indicated generally at 106, for presenting selected information from the example system 100 of FIG. 1. FIG. 2A illustrates a tabbed view of operator interface 106 in which the geolocation information 138 display tab "GIS" 210 is activated for viewing. FIG. 2B illustrates a tabbed view of operator interface 106 in which the alerts 136 display tab "Alert" 212 is activated for viewing. FIGS. 2A and 2B include browser window 202, upper tab display area 204, lower tab display area 206, and tree directory 208. Operator interface 106 displays those one or more group communication services 112 that are assigned by administrator interface 102 to the operator 108 for monitoring, including events 134, alerts 136, and geolocation information 138 from the assigned group communication services 112. Operator interface 106 may display events 134, alerts 136, and geolocation information 138 on a real-time or near real-time basis and/or any other events 134, alerts 136, and/or geolocation information 138 that the operator 108 may request and that the operator interface 106 may receive from database 122 of central server 110 through the various components and operations of central server 110 discussed above with respect to FIG. 1.

Browser window 202 generally refers to any suitable display template produced by a browser application to display a web page. As illustrated, browser window 202 displays the web page at which an operator 108 may monitor events 134, alerts 136, and geolocation information 138 for each assigned communication service 112, referred to herein as the "main" page for a particular operator 108. Although not illustrated, operator 108 may scroll up and down within tabs and/or windows to view particular events 134, alerts 136, and geolocation information 138 retrieved by the operator interface 106. Operator 108 may also request other events 134, alerts 136, and/or geolocation information 138 that have or have not been previously retrieved by the operator interface 106, and browser window 202 may display the results of these requests. According to particular embodiments, browser window 202 displays the web address for the currently displayed one of multiple web pages associated with system 100. Browser window 202 may also display viewing options, system preferences, links to other web pages, and any other displays, options or links, including, but not limited to, options associated with system 100 or advertisers of system 100.

As illustrated in browser window 202, "System" 214, if selected, displays a drop down menu that offers the operator 108 multiple viewing options. For example, a "Tab" view, if selected, displays a separate tab for each assigned group communication service 112 (as illustrated by FIGS. 2A-2B) and a "Window" view, if selected, displays a separate window for each assigned group communication service 112 (not illustrated). To change the view from a tabbed view to a windowed view, operator 108 may select the System 214 drop down menu and choose the "Window" menu item.

As illustrated in browser window 202, "Chat" 216, if selected, displays a drop down menu that offers the operator 108 multiple system preferences. For example, a "Manage Alerts" menu item, if selected, provides a pop-up window in which the operator 108 may create a new alert, edit an existing alert, or delete an alert by pressing the corresponding button. To create a new Alert, operator 108 may select the Chat 216 drop down menu, choose the "Manage Alerts" menu item, and type in, for example, a keyword-type trigger 128 "Iraq" and a trigger name "Keyword search for Iraq."

In the particular embodiment illustrated by browser window 202 of FIGS. 2A and 2B, the main page includes an upper tab display area 204, lower tab display area 206, and tree directory 208. Upper tab display area 204 provides a choice for viewing GIS tab 210 or Alerts tab 212. GIS tab 210 (FIG. 2A) illustrates an example map of geolocation information 138 for the assigned group communication services 112. The operator 108 may navigate the map by clicking and dragging the map in desired directions and may zoom in and out to display the map in desired display resolutions. An example alert 136 shown within Alerts tab 212 (FIG. 2B) displays the date, time, user that triggered the alert 136, the assigned group communication service 112 where the alert 136 occurred, the trigger 128 associated with the alert 136, and the trigger name for the associated trigger 128. All of this is extremely useful when trying to track when and where an alert 136 occurred.

Lower tab display area 206 displays all events 134, alerts 136, and geolocation information 138 by group communication service 112, either one assigned group communication service 112 at a time in a tabbed view (as illustrated) or one or more assigned group communication services 112 at a time in a windowed view (not illustrated). Lower tab display area 206 displays events 134, alerts 136, and geolocation information 138 in chronological order, including any system generated events 134, such as automated responses. Lower tab display area 206 displays a separate window, tab or other graphical container for each assigned group communication service 112. In the particular illustrated embodiment, lower tab display area 206 displays a list of active users 218 that are associated with a particular assigned group communication service 112 when the tab or window for that assigned group communication service 112 in lower tab display area 206 is highlighted. For example, the list of active users 218 illustrated by FIGS. 2A and 2B lists the active users in the Islamabad group communication service 112, and the Islamabad tab 216 is activated. An example event 134 shown within Islamabad tab 208 displays the date, time, user responsible for the event 134, and the event 134. An example occurrence of an alert 136 or geolocation information 138 shown within the Islamabad tab 208 displays the date, time, user responsible for the alert 136 or geolocation information 138, and the trigger 128 or geolocation information 138. All of this is extremely useful for monitoring assigned group communication services 112.

Tree directory 208 generally displays a directory of tabs and/or windows that may be shown in upper tab display area 204 and lower tab display area 206. Tree directory 208 includes an expandable entry named "Venues," which includes expandable entries for the assigned group communication services 112, expandable entries for the triggers 128 for each assigned group communication service 112, and expandable entries for the geolocation information 128 for each assigned group communication service 112. Tree directory 208 also includes an expandable entry named "GIS," which includes entries for each of the mapped user locations on the map shown within GIS tab 212.

In addition to the main page displaying events 134, alerts 136, and geolocation information 138 for each communication service 112 (illustrated by FIGS. 2A and 2B), browser window 202 may also display other web pages associated with system 100 and links for operator 108 to switch between the associated web pages. For example, browser window 202 may provide a home page for an operator 108 to login to the main page to monitor the assigned group communication services 112. Browser window 202 may also provide links to web pages associated with system 100, such as links to instructions manuals and/or web pages that are not associated with system 100, such as advertising links.

The description of FIGS. 2A and 2B provides an example of an operator interface 106. The example explains particular embodiments and is not all-inclusive. Elements of system 100 may communicate with operator interfaces 106 having any appropriate format, display, contents, and functionalities.

FIG. 3 is a flowchart illustrating a method, indicated generally at 300, for monitoring multiple group communication services using multiple protocols in accordance with various embodiments of the present disclosure. As illustrated, method 300 shows the steps involved for central server 110 to receive translated event data (events 134) from agent server 142 using a unified communication protocol, generate event queues, alert queues, and geolocation information queues for each one of multiple operator interfaces 106, and transmit the appropriate queues to the appropriate locations within the appropriate operator interfaces 106 according to their operator profiles 126.

According to particular embodiments, in step 302, event handler 140 of central server 110 receives events 134 collected by automated agents 144 from agent server 142. In particular embodiments, event handler 140 receives events 134 through an HTTP connection. Step 302 may include associating events 134 received from agent servers 142 with the particular group communication services 112 from which the events were collected by a particular agent 144. In step 304, event handler 140 stores received events 134 in database 122. In particular embodiments, events 134 may be stored categorically as events 134 and/or alerts 136 and/or geolocation information 138. Alternatively, events 134 may be stored without regard for categorical distinctions.

In step 306, alert interface 118 monitors database 122 for events 134 that satisfy triggers 128, generates alerts 136 for events 134 that satisfy triggers 128, and queues alerts 136 in a logical order. Step 306 may include processing events 134 to apply triggers (for example, event handler 140 may search received events 134 for text that matches a keyword-type trigger 128) or otherwise examining and responding to incoming events 134. As another example, event handler 140 may search received events 134 for text and/or geolocation information 138 that matches an instruction to generate an automated response. As a further example, event handler 140 may test geolocation information 138 for one or more users' locations or for whether any users of one or more group communication services 112 match a particular location. In step 308, geolocation information interface 120 monitors database 122 for geolocation information 138 and queues geolocation information 138 in a logical order.

In step 310, operator interfaces 106 receive from central server 110 and display to operators 108 data collected from one or more of the group communication services and associated events 134, alerts 136, and geolocation information 138. In particular embodiments, central server 110 determines one or more group communication services 112 assigned to each operator interface 106 according to operator profiles 126. In particular embodiments, method 300 may include generating alerts 136 based on triggers 128 satisfied by the events and transmitting the generated alerts 136 to the appropriate operator interface 106. In particular embodiments, central server 110 may queue the alerts 136 generated by one or more agent servers 142 and/or by central server 110.

In addition, in step 310, control interface 114 maps the responsive event 134 queues, responsive alert 136 queues, and responsive geolocation information 138 queues to the appropriate operator interfaces 106 based on the operator profiles 126. Control interface 114 ensures that the appropriate events 134 are sent from event handler 140 to the appropriate window or location within operator interface 106 for each operator 108. Control interface 114 ensures that the appropriate alerts 136 are sent from alert interface 118 to the appropriate window within operator interface 106 for each operator 108. Control interface 114 ensures that the appropriate geolocation information 138 is sent from geolocation information interface 120 to the appropriate window or location within operator interface 106 for each operator 108.

FIG. 4 is a flowchart that illustrates a method for playing back pre-recorded communications in a communication service 112 in accordance with various embodiments of the present disclosure. As illustrated, method 400 shows the steps involved for a central server 110 to maintain user profiles 132 and events 134 prerecorded from text-based group communication services 112*a,* receive playback instructions 130, retrieve events 134 from the database 122, and output the retrieved events 134 to an agent server 142. In addition, method 400 shows the steps involved for a playback agent 144 deployed by the agent server 142 to receive one of the user profiles 132 and an identification of a target group communication service 112*b,* to translate the retrieved events 134 into a native communication protocol of the target group communication service 112*b,* and to submit events 134 to the target group communication service 112*b.*

According to particular embodiments, in step 402, a central server 110 maintains in a database 122 user profiles 132 and events 134 prerecorded from text-based group communication services 112*a.* The events 134 include the timing information associated with the events 134. In particular embodiments, in step 402, central server 110 associates the events 134 received from agent servers 142 with the particular group communication services 112 from which the events 134 were collected. For example, the central server 110 may store events 134 in the database as event queues wherein each event queue is associated with the particular group communication service 112*a* from which the events 134 were collected.

In step 404, a playback module 150 of central server 110 receives playback command triggers 128, which include playback instructions 130 and an identification of a target group communication service 112*b.* In step 406, the playback module 150 of central server 110 retrieves portions of the events 134 from the database 122 for submission to the target group communication service 112*b* according to the playback instructions 130. The playback instructions 130 specify which recorded data is to be retrieved form the database and replayed. In step 408, the playback module 150 of central server 110 outputs the retrieved events 134 to an agent server 142 according to the timing information associated with the events 134. In particular embodiments, agent server 142 deploys protocol-specific playback agents 144 to which events 134 are outputted by playback module 150 according to the timing information associated with the events 134. Thus the agent server 142 is controlled by the playback module 150's output of prerecorded events 134 retrieved from a database 122. In particular embodiments, the playback module 150 of central server 110 outputs the retrieved events 134 via HTTP requests to an agent server 142.

In addition, in step 410, a playback agent 144 deployed by the agent server 142 receives one of the user profiles 132 and an identification of a target group communication service 112*b.* The playback module 150 sends the user profiles 132 and an identification of a target group communication service 112*b* to agent server 142. In particular embodiments, the playback module 150 of central server 110 sends user profiles 132 and an identification of a target group communication service 112*b* through an HTTP connection to agent server 142. The playback module 150 sends user profiles 132 and events 134 to the bot server via HTTP requests.

The playback agent 144 uses the user profile 132 and the identification of the target group communication service 112*b* to register as an active user of the target group communication service 112*b.* In step 412, the playback agent 144 translates the retrieved events 134 into a native communication protocol of the target group communication service 112*b.* Prior to translating the retrieved events 134, the playback agent 144 receives these events 134 from the playback module 150. In particular embodiments, playback module 150 queues the retrieved events 134 into multiples queues, maps the appropriate queue to the appropriate agent 144, and outputs the event queues to the playback agents 144. In step 414, the playback agent 144 submits the translated events 134 to the target group communication service 112*b.*

The methods described with respect to FIGS. 3 and 4 are merely illustrative. The manner of operation and devices indicated as performing the operations may be modified in any appropriate manner. While the method describes particular steps performed in a specific order, system 100 contemplates any suitable collection and arrangement of elements performing some, all, or none of these steps in any operable order.

Particular examples specified throughout this document are intended for example purposes only and are not intended to limit the scope of the present disclosure. In particular, the illustrations in the FIGURES are not necessarily drawn to scale.

What is claimed is:

1. A system for outputting prerecorded communications comprising:
    a central server comprising:
        a database maintaining one or more user profiles, a plurality of event data prerecorded from one or more real-time, text-based group communication services, the event data including a plurality of events and a plurality of timing characteristics associated with the events; and
        a first processing device comprising a playback module adapted to receive a plurality of playback instructions, to retrieve portions of the event data from the database according to the playback instructions, and to output the events from the retrieved portions of the event data according to the timing characteristics associated with the events, wherein the playback module outputs the events according to a first communication protocol; and
    an agent server comprising a second processing device adapted to deploy a playback agent, the playback agent adapted to receive a selected one of the user profiles and an identification of a target group communication service, to register with the target group communication service using the received user profile, to monitor a plurality of original communications content exchanged by a plurality of users in the target group communication service, to detect a trigger in the plurality of original communications content, to automatically retrieve the pre-recorded event data in response to detecting the trigger, and automatically insert the pre-recorded event data into the target group communication service in response to detecting the trigger while maintaining the plurality of original communications content, and to playback the pre-recorded event data in the target group communication service, the target group communication service enabling a plurality of users to communicate in real-time,
    wherein the play back agent is adapted to translate the received events into a native communication protocol of the target group communication service, and to submit the translated events to the target groups communication service.

2. The system of claim 1, wherein the playback instructions comprise a script specifying a target group communication service and a portion of the event data.

3. The system of claim 1, further comprising an operator interface operable to transmit the playback instructions to the central server.

4. The system of claim 1, wherein the playback module is further adapted to transmit the selected user profile, the identification of the target group communication service, and the portion of the outputted events to a selected agent server using a web-based communication protocol.

5. The system of claim 1, wherein a plurality of users are capable of obtaining a user profile, registering with the target group communication service using the user profile, and viewing the submitted events.

6. The system of claim 1, wherein a native communication protocol of the target group communication service is selected from a group consisting of:
Internet Relay Chat (IRC);
OSCAR protocol;
Microsoft Notification Protocol (MSNP);
rendezvous protocol;
Yahoo! Messenger Protocol; and
Extensible Messaging and Presence Protocol ("XMPP").

7. The system of claim 1, wherein the playback agent is further operable to:
receive an automated response trigger;
monitor the plurality of original communications content exchanged by a plurality of users in the target group communication service;
apply the trigger to the communications; and
for each of the communications that satisfies the automated response trigger, retrieve a portion of the event data and submit the events from the portion of the event data to the target group communication service in response to the communication.

8. A method for outputting prerecorded communications comprising:
maintaining in a database one or more user profiles, a plurality of event data prerecorded from one or more real-time, text-based group communication services, the event data including a plurality of events and a plurality of timing characteristics associated with the events;
receiving, by a playback module, a plurality of playback instructions; retrieving, by the playback module, portions of the event data from the database according to the playback instructions;
outputting, by the playback module, the events from the retrieved portions of the event data according to the timing characteristics associated with the events and according to a first communication protocol; and
deploying, by an agent server, a playback agent, the playback agent adapted to receive a selected one of the user profiles and an identification of a target group communication service, to register with the target group communication service using the received user profile, to monitor a plurality of original communications content exchanged by a plurality of users in the target group communication service, to detect a trigger in the plurality of original communications content, to automatically retrieve the pre-recorded event data in response to detecting the trigger, and automatically insert the pre-recorded event data into the target group communication service in response to detecting the trigger while maintaining the plurality of original communications content, and to playback the pre-recorded event data in the target group communication service, the target group communication service enabling a plurality of users to communicate in real-time;
wherein the play back agent is adapted to translate the received events into a native communication protocol of the target group communication service, and to submit the translated events to the target groups communication service.

9. The method of claim 8, wherein the playback instructions comprise a script specifying a target group communication service and a portion or the event data.

10. The method of claim 8, further comprising transmitting, by an operator interface, the playback instructions to the central server.

11. The method of claim 8, further comprising transmitting, by the playback module, the selected user profile, the identification of the target group communication service, and the portion of the outputted events to a selected agent server using a web-based communication protocol.

12. The method of claim 8, wherein a plurality of users are capable of obtaining a user profile, registering with the target group communication service using the user profile, and viewing the submitted events.

13. The method of claim 8, wherein a native communication protocol of the target group communication service is selected from a group consisting of:
Internet Relay Chat (IRC);
OSCAR protocol;
Microsoft Notification Protocol (MSNP);
rendezvous protocol;
Yahoo! Messenger Protocol; and
Extensible Messaging and Presence Protocol ("XMPP").

14. A method for outputting prerecorded communications comprising:
maintaining in a database of one or more user profiles, a plurality of event data prerecorded from one or more real-time, text-based group communication services, the event data including a plurality of events and a plurality of timing characteristics associated with the events;
receiving, by a playback module, a plurality of playback instructions;
retrieving, by the playback module, portions of the event data from the database according to the timing characteristics associated with the events and according to a first communication protocol; and
deploying, by an agent server, a playback agent, the playback agent adapted to receive a selected one of the user profiles and an identification of a target group communication service, to register with the target group communication service using the received user profile, to receive at least a portion of the outputted events from the playback module, to translate the received events into a native communication protocol of the target group communication service, and to submit the translated events to the target groups communication service,
wherein the playback agent is further operable to:
receive an automated response trigger;
monitor a plurality of original communications content exchanged by a plurality of users in the target group communication service;
apply the trigger to the communications; and
for each of the communications that satisfies the automated response trigger, retrieve a portion of the event data and submit the events from the portion of the event data to the target group communication service while maintaining the plurality of original communications content exchanged by a plurality of users in the target group communication service in response to the communication.

15. A non-transitory computer readable storage medium comprising
software for outputting prerecorded communications, the software comprising computer code that is operable when executed to:
maintain in a database one or more user profiles, a plurality of event data prerecorded from one or more real-time, text-based group communication services, the event data including a plurality of events and a plurality of timing characteristics associated with the events;

receive, by a playback module, a plurality of playback instructions;

retrieve, by the playback module, portions of the event data from the database according to the playback instructions;

output, by the playback module, the events from the retrieved portions of the event data according to the timing characteristics associated with the events and according to a first communication protocol; and deploy, by an agent server, a playback agent, the playback agent adapted to receive a selected one of the user profiles and an identification of a target group communication service, to register with the target group communication service using the received user profile, to monitor a plurality of original communications content exchanged by a plurality of users in the target group communication service, to detect a trigger in the plurality of communications, to automatically retrieve the pre-recorded event data in response to detecting the trigger, and automatically insert the pre-recorded event data into the target group communication service in response to detecting the trigger while maintaining the plurality of original communications content, and to playback the pre-recorded event data in the target group communication service, the target group communication service enabling a plurality of users to communicate in real-time;

wherein the play back agent is adapted to translate the received events into a native communication protocol of the target group communication service, and to submit the translated events to the target groups communication service.

16. The non-transitory computer readable storage medium of claim 15, wherein the playback instructions comprise a script specifying a target group communication service and a portion of the event data.

17. The non-transitory computer readable storage medium of claim 15, the computer code further operable when executed to transmit, by an operator interlace, the playback instructions to the central server, by the playback module, the selected user profile, the identification of the target group communication service, and the portion of the outputted events to a selected agent server using a web-based communication proto by an operator interlace, the playback instructions to the central server.

18. The non-transitory computer readable storage medium of claim 15, the computer code further operable when executed to transmit, by the playback module, the selected user profile, the identification of the target group communication service, and the portion of the outputted events to a selected agent server using a web-based communication protocol.

19. The non-transitory computer readable storage medium of claim 15, wherein a plurality of users are capable of obtaining a user profile, registering with the target group communication service using the user profile, and viewing the submitted events.

20. The non-transitory computer readable storage medium of claim 15, the computer code further operable when executed to:

receive, by the playback agent, an automated response trigger;

monitor, by the playback agent, the plurality of original communications content exchanged by a plurality of users in the target group communication service;

apply, by the playback agent, the trigger to the communications; and for each of the communications that satisfies the automated response trigger, retrieve a portion of the event data and submit the events from the portion of the event data to the target group communication service in response to the communication.

* * * * *